US010805936B1

(12) United States Patent
Uln et al.

(10) Patent No.: US 10,805,936 B1
(45) Date of Patent: Oct. 13, 2020

(54) DEVICE, SYSTEM AND METHODS FOR MITIGATING INTERFERENCE IN A WIRELESS NETWORK

(71) Applicant: Cypress Semiconductor Corporation, San Jose, CA (US)

(72) Inventors: Kiran Uln, Pleasanton, CA (US); Kamesh Medapalli, San Jose, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 16/721,051

(22) Filed: Dec. 19, 2019

Related U.S. Application Data

(60) Provisional application No. 62/877,946, filed on Jul. 24, 2019.

(51) Int. Cl.
*H04W 72/08* (2009.01)
*H04W 72/04* (2009.01)
*H04L 5/00* (2006.01)

(52) U.S. Cl.
CPC ......... *H04W 72/082* (2013.01); *H04L 5/0062* (2013.01); *H04W 72/0426* (2013.01); *H04W 72/0446* (2013.01)

(58) Field of Classification Search
None
See application file for complete search history.

(56) References Cited

U.S. PATENT DOCUMENTS

| 7,027,424 | B1* | 4/2006 | Horvat | H04B 7/2656 370/337 |
| 2009/0033550 | A1* | 2/2009 | Wolf | G01S 19/21 342/357.59 |
| 2009/0212998 | A1* | 8/2009 | Szajnowski | G01S 13/106 342/204 |
| 2009/0286498 | A1* | 11/2009 | Katayanagi | H04B 1/1081 455/277.2 |
| 2013/0003671 | A1* | 1/2013 | Wang | H04B 1/005 370/329 |

(Continued)

OTHER PUBLICATIONS

International Search Report for International Application No. PCT/US2020/042716 dated Aug. 20, 2020; 2 pages.

(Continued)

*Primary Examiner* — Otis L Thompson, Jr.

(57) ABSTRACT

A wireless communication device and method for operating the same for mitigating interference in a wireless communication network are provided. Generally, the method includes sensing with the wireless communication device pulses of electromagnetic radiation recurring within a band of frequencies used by the device for communication of signals, identifying the pulses as interference, and determining a number of frequencies of the interference within the band of frequencies used by the wireless communication device. Next, a sensitivity of the wireless communication device is reduced upon sensing one of the pulses and repeated at a frequency corresponding to the frequency of the interference. Thus, a spectrum of electromagnetic radiation around the wireless communication device is perceived by the device as free of interference, enabling it to transmit and/or receive more often. Other embodiments are also disclosed.

18 Claims, 8 Drawing Sheets

(56) References Cited

U.S. PATENT DOCUMENTS

| | | | |
|---|---|---|---|
| 2013/0070816 A1* | 3/2013 | Aoki | H04W 72/046 375/219 |
| 2014/0269554 A1* | 9/2014 | Shapira | H04B 17/0085 370/329 |
| 2017/0086146 A1* | 3/2017 | Chen | H04W 52/244 |
| 2018/0128589 A1* | 5/2018 | Mathkar | G01B 7/003 |
| 2018/0241367 A1* | 8/2018 | Horita | H03H 7/12 |
| 2019/0342842 A1* | 11/2019 | Stephens | H04W 24/02 |
| 2020/0052730 A1* | 2/2020 | Pullela | H04B 1/1638 |

OTHER PUBLICATIONS

Written Opinion of the International Searching Authority for International Application No. PCT/US2020/042716 dated Aug. 20, 2020; 5 pages.

\* cited by examiner

DEVICE, SYSTEM AND METHODS FOR MITIGATING INTERFERENCE IN A WIRELESS NETWORK

CROSS-REFERENCE TO RELATED APPLICATIONS

This application claims the benefit of priority under 35 U.S.C. 119(e) to U.S. Provisional Patent Application Ser. No. 62/877,946, filed Jul. 24, 2019, which is incorporated by reference herein in its entirety.

TECHNICAL FIELD

This disclosure relates generally to wireless communication systems, and more particularly, to a wireless device, system and methods for operating the same to minimize or eliminate the effect of interference when the wireless device is coexistent or co-located in a wireless network with an interfering device.

BACKGROUND

Proliferation of internet of things (IoT) devices in smart homes and businesses is leading to increased adoption of wireless networking technologies, such as Bluetooth (BT) Wi-Fi or wireless local area network (WLAN) incorporating various versions of the IEEE 802.11 protocol in access points (AP), wireless or BT speakers or entertainment devices, security alarms and even in home appliances like refrigerators, coffee makers and microwave ovens. However, many of these devices are either coexistent or co-located with other devices, such as microwave ovens, which generate high-power signals in the 2.4 GHz commonly used in Wi-Fi and BT networks, thereby causing disruptive interference that can lead to high packet-loss and/or latency and/or disconnections.

Shutting off Wi-Fi or BT networks when an interfering device is operating is often either impractical or undesired.

Accordingly, there is a need for wireless transceiver and methods for operating the same that reduces interference with coexistent or co-located devices without substantially affecting cost, complexity or performance of the transceiver or the interfering device.

SUMMARY

A wireless communication device and method for operating the same for mitigating interference in a wireless communication network are provided. Generally, the wireless communication device includes or is implemented in an integrated circuit (IC) including a receiver coupled to an antenna, the receiver configured to sense pulses of electromagnetic radiation and decode signals received therein; a transmitter coupled to the antenna and configured to encode and transmit signals as electromagnetic radiation from the antenna; and a processor coupled to the receiver and transmitter to control operation thereof. The processor is configured to identify interference among the pulses received by the receiver; determining a number of frequencies of the interference within a band of frequencies used by the receiver; reduce sensitivity of the receiver upon sensing one of the pulses at a frequency corresponding to the frequency of the interference; and control the receiver and transmitter to communicate signals while operating at reduced sensitivity.

In one embodiment, the method involves or includes sensing with the wireless communication device pulses of electromagnetic radiation recurring within a band of frequencies used by the device for communication of signals, identifying the pulses as interference, and determining operating frequency band of the interference. Next, a sensitivity of the wireless communication device is reduced upon sensing one of the pulses and repeated at a frequency corresponding to the frequency of the interference. Thus, a spectrum of electromagnetic radiation around the wireless communication device is perceived by the device as free of interference, enabling it to transmit and/or receive more often.

Further features and advantages of embodiments of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to a person skilled in the relevant art(s) based on the teachings contained herein.

BRIEF DESCRIPTION OF THE DRAWINGS

Embodiments of the invention will now be described, by way of example only, with reference to the accompanying schematic drawings in which corresponding reference symbols indicate corresponding parts. Further, the accompanying drawings, which are incorporated herein and form part of the specification, illustrate embodiments of the present invention, and, together with the description, further serve to explain the principles of the invention and to enable a person skilled in the relevant art(s) to make and use the invention.

DETAILED DESCRIPTION

A wireless communication system, wireless device and methods for operating the same for mitigating interference in a wireless communication network are provided. The device and methods of the present disclosure are particularly useful in or with Wi-FI and Bluetooth (BT) wireless networks including appliances with both wireless communication devices or transceivers and non-communication devices, which can cause interference with the wireless communication devices.

Figure 1:
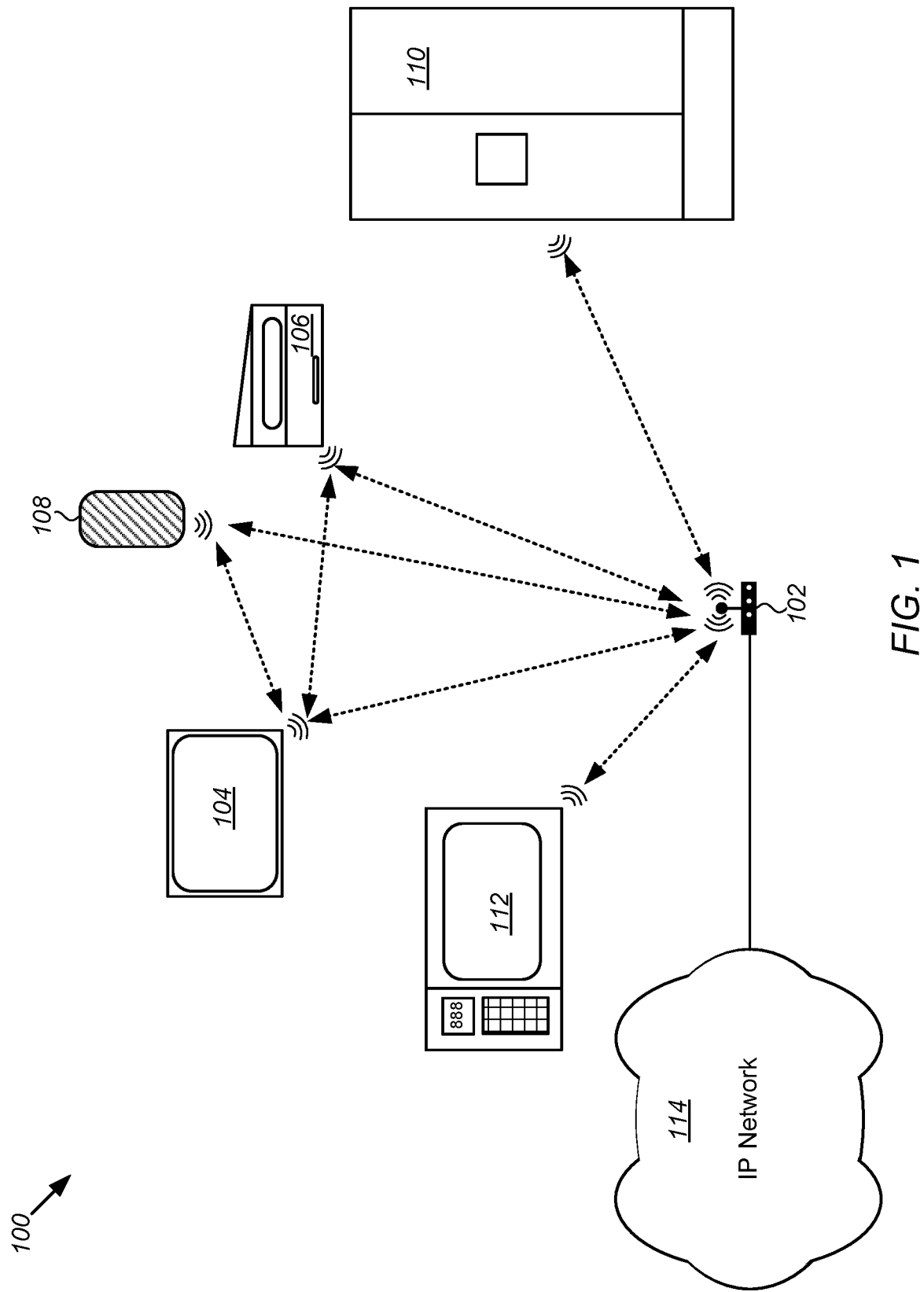
FIG. 1 is a schematic block diagram illustrating an exemplary wireless network including multiple transceivers and potentially interfering devices.

FIG. 1 is a schematic block diagram illustrating an exemplary wireless network 100 including multiple stations (STA) and access points (AP) each as well as a number of and potentially interfering devices for which the wireless devices, systems and methods of the present disclosure are particularly useful. Referring to FIG. 1, the wireless network can use or include a Bluetooth (BT) wireless network using standard BT or Bluetooth low energy (BLE) technology, or a Wi-Fi wireless network, such as a wireless local area net (WLAN), incorporating various versions of the IEEE 802.11 protocol, or a combination of both. Generally, the wireless network 100 includes at least one station (STA 102) through which one or more access points (AP 104 through 112) can communicate with an internet protocol (IP) network 114. The IP network 114 can include the Internet or a local area network (LAN) through which the STA 102 and APs 104-112 can connect to a computer, server or other wired or wireless networks (not shown in this figure). The access points can include any number of Bluetooth and/or Wi-Fi enabled devices or transceivers. For example, in the embodiment shown in FIG. 1 access points include a mobile or desktop computer 104, a multifunction printer/scanner/fax machine 106, a wireless or smart speaker 108, and a number of internet-of-things (IoT) devices included in home appliances such as a refrigerator 110 or microwave ovens 112. Additionally, the wireless network 100 and APs 104-112 can support direct peer-to-peer (P2P) communication. For example, as shown in FIG. 1 the wireless network 100 and transceivers in the computer 104, printer/scanner/fax machine 106 and smart speaker 108 can support P2P communication between these devices. It is important to note that while FIG. 1 shows the STA 102 and APs 104-112 as connected through a single wireless network 100 the connections can likely will utilize multiple different wireless technologies or protocols as noted above. Thus, while the computer 104 might connect to the STA 102 using an 802.11 protocol, it can additionally and simultaneously connect to the printer/scanner/fax machine 106 using a standard BT technology, and to the smart speaker 108 using BLE. A unifying characteristic of each of these different wireless technologies is that communication is accomplished using packet switching in which data is formatted into packets including a header and payload information prior to being communicated over a digital network. Data in the header are used by access points and stations to direct the packet to its destination where the payload is extracted and used by application software.

Figure 2A:
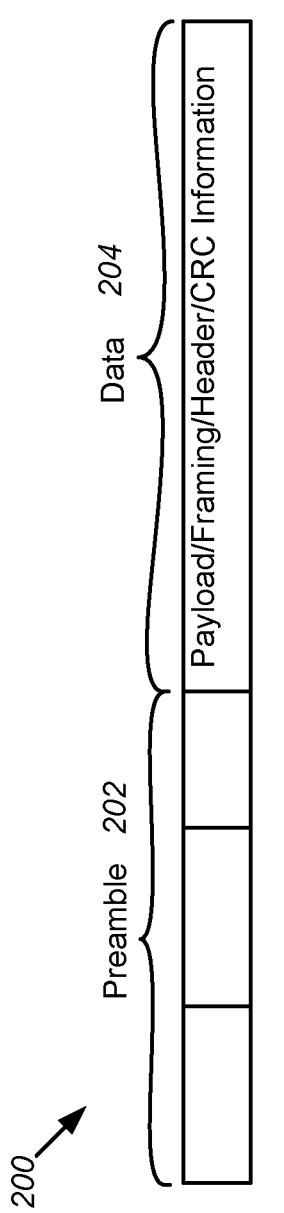
FIG. 2A depicts an embodiment of a format of a standard frame or packet in a wireless network operated using a standard Wi-Fi or 802.11 protocol.

FIG. 2A is a block diagram depicting an embodiment of a Wi-Fi packet in a wireless network operated using a standard IEEE 802.11 protocol. Referring to FIG. 2A it is noted that the packet 200 generally includes or consists of a number of fields including a 202 preamble field including a number of preamble sub-fields or segments, and a data field 204, which generally includes training fields, header information, data or payload and cyclical redundancy (CRC) bits.

Figure 2B:
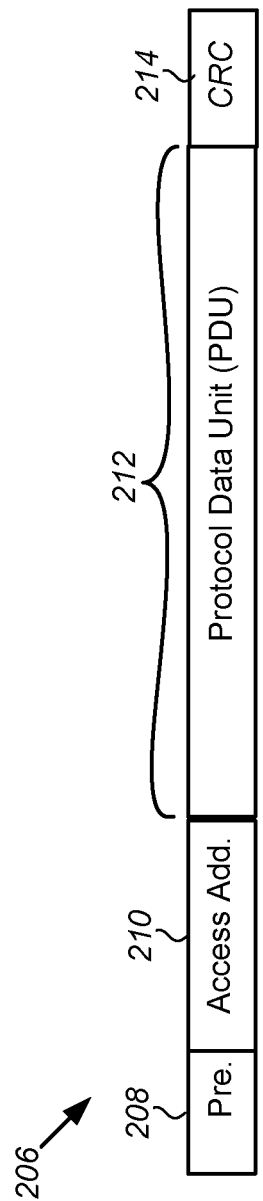
FIG. 2B depicts an embodiment of a format of a standard frame or packet in a wireless network operated using a standard Bluetooth (BT) protocol.

FIG. 2B is a block diagram depicting an embodiment of a Bluetooth (BT) packet in in a wireless network operated using a standard Bluetooth protocol. Referring to FIG. 2B it is noted that the BT packet 206 generally includes or consists of a number of fields including a preamble field 208, an access address 210, protocol data unit (PDU 212), which generally includes header information, data or payload, and a CRC field or bits 214.

The structures of the Wi-Fi and BT packets 202 and 206 are significant to the invention of the present disclosure because while in certain circumstance pulses of electromagnetic radiation emanating from an interfering device can mimic or resemble the power, frequency and duration of the packets used in a wireless network, these pulses will not include header and/or data information, and thus can be readily distinguished from the Wi-Fi and BT packets of actual communication signals in the wireless network.

Figure 3A:
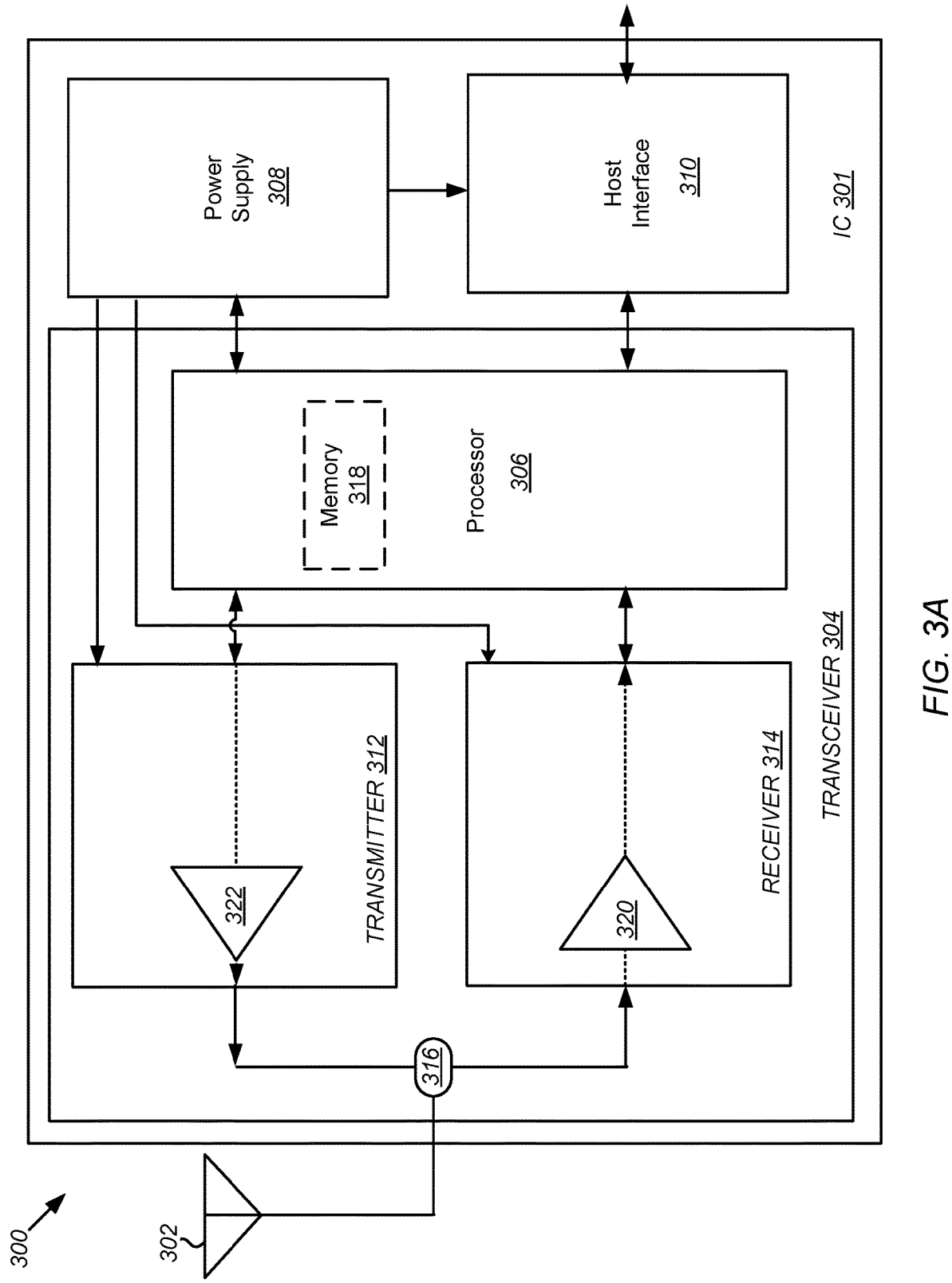
FIG. 3A is a schematic block diagram illustrating a Wi-Fi device 300 implemented in a single integrated circuit (IC) that includes circuits and elements configured to reduce or mitigate interference from coexistent or co-located devices according to an embodiment of the present disclosure.

FIG. 3A is a simplified block diagram depicting an embodiment of a wireless communication device or wireless device 300 including or implemented as a single integrated circuit (IC 301) in a station or access point, and which includes circuits and elements configured to reduce or mitigate interference from coexistent or co-located wireless communication devices and/or non-communication, interfering devices. Since communication systems in general and radios in particular are well known in the art, detailed descriptions of well-known functions and structures incorporated in the wireless device 300 depicted in FIG. 3A have been omitted to avoid obscuring the subject matter of the present disclosure.

Referring to FIG. 3A, the wireless device 300 generally includes an antenna 302, a BT or Wi-Fi transceiver 304, a processor 306, such as a microprocessor or programmable system on a chip (PSOC), a power supply 308 and one or more host interfaces 310 through which the wireless device 300 communicates with a host access point or station (not shown in this figure). The transceiver 304 includes a transmitter 312 including a power amplifier 322 and circuits to encode or modulate and transmit signals provided by the processor 306, a receiver 314 including a variable gain amplifier 320 and circuits to receive and decode or demodulate signals from the antenna 302 and provide the signals to the processor 306, and a switching element or switch 316 to alternately couple and decouple the transmitter and receiver to the antenna.

Generally, the antenna 302 is external to the IC 301. In some embodiments the antenna 302 can be separately implemented on a printed circuit board (PCB) (not shown) to which the IC 301 is mounted or attached. Alternatively, the antenna 302 can be integrally formed on the same the IC 301, or on a separate IC or substrate packaged in a single multi-chip chip package with the IC including the transceiver 304, processor 306, power supply 308 and host interface 310.

In accordance with the present disclosure the processor 306 is configured to identify interference among the pulses received by the receiver 314, determine a frequency or range of frequencies in the interference, and reduce sensitivity of the receiver upon sensing one of the pulses at a frequency corresponding to the frequency of the interference. Generally, because the wireless network is a packet based wireless network the processor 306 can identify the interference by determining the pulses do not include header information or data. Alternatively, the pulses can be identified as interference by comparing or matching a frequency or range of frequencies and duration of the pulses (chirp-rate) to a known pattern of microwave pulses stored in a memory 318 of the processor 306.

The processor 306 can be configured to reduce sensitivity of the receiver 314 by reducing gain of the variable gain amplifier 320 in the receiver. Alternatively, the processor 306 can be configured to reduce sensitivity of the receiver 314 by controlling the power supply 308 reduce power to the receiver, or controlling the switch 316 to decouple the antenna 302 from the receiver.

Figure 3B:
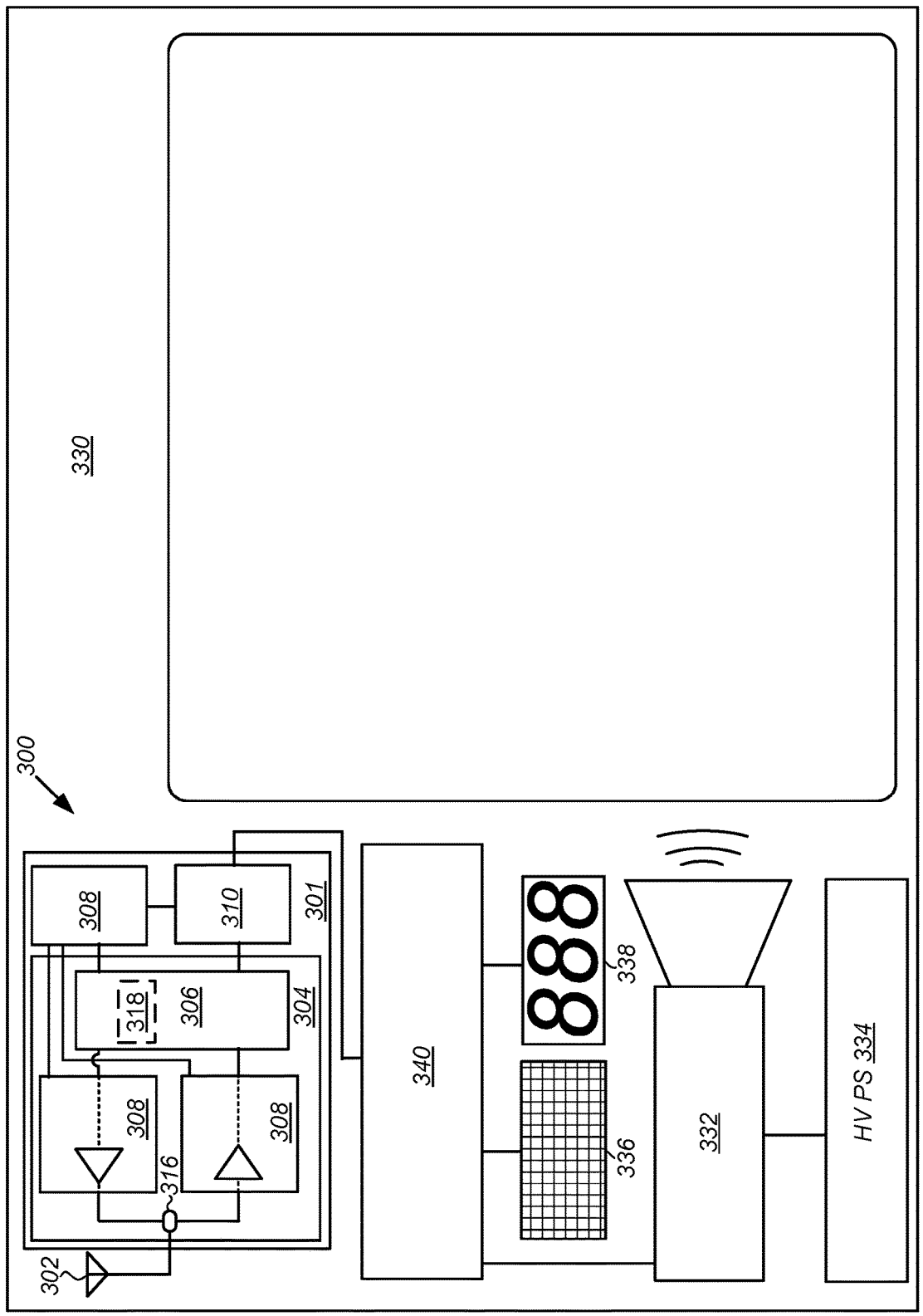
FIG. 3B is a schematic block diagram illustrating an exemplary appliance including the IC of FIG. 3A and a non-communication or interfering device co-located therewith that is a source of interference.

FIG. 3B is a schematic block diagram illustrating an exemplary appliance 330 including the wireless device 300 of FIG. 3A and a non-communicating interfering device co-located therewith that is a source of interference. By co-located it is meant either the wireless device 300 is embodied or implemented in a shared chassis or housing with the interfering device and may share one or more circuits, such as a power supply or user interface, or is embodied in a separate chassis located adjacent or proximal to the interfering device. In the embodiment shown the appliance 330 is a microwave oven and the interfering device is a microwave generator 332, such as a magnetron or travelling wave tube. In addition to the microwave generator 332 the appliance 330 includes a high voltage (HV) power supply 334, a key pad 336 through which a user can program parameters including cooking time and power levels, a display 338 and processor 340 or microcontroller to control operation of the devices and components of the microwave and to interface with the wireless device 300.

Although consumer appliances 330 used in homes or business are typically shielded against undesired emission of electromagnetic radiation, many of these devices, such as microwave ovens, generate high-power pulses in the 2.4 GHz band or range commonly used in Wi-Fi and BT wireless communication networks, which can exceed the capacity of the shielding thereby causing disruptive interference that can lead to high packet-loss and/or latency with other devices coexistent in a wireless network with the appliance. This interference can be especially problematic in appliances 330, such as that shown, in which the wireless device 300 is not only coexistent with the interfering device, but is co-located within a common or shared enclosure with the interfering device. Thus, it is desirable that the processor 306 and the transceiver 304 of the wireless device 300 are configured to reduce or mitigate interference from coexistent and/or co-located devices.

Methods for operating a wireless device coexistent or co-located in a BT and/or a Wi-FI wireless network with an interfering device to minimize or eliminate interference will now be described with reference to the flowcharts of FIGS. 4 through 9.

Figure 4:
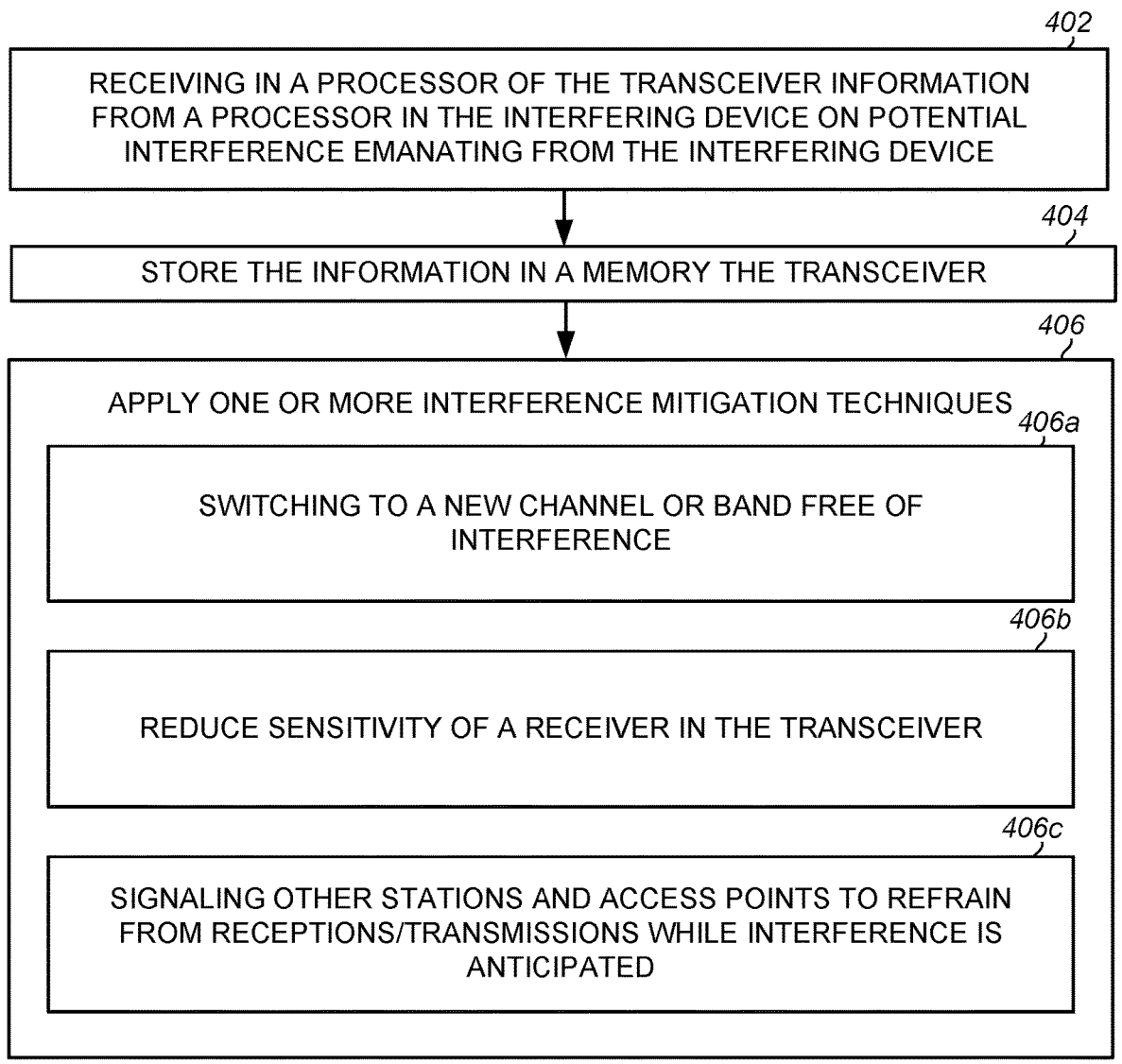
FIG. 4 is a flowchart of a method for operating a Wi-Fi transceiver to minimize or eliminate interference in a wireless network wherein the transceiver is co-located within an interfering device according to an embodiment of the present invention.

In particular, FIG. 4 is a flowchart of a method for operating a wireless device in a Wi-Fi wireless network to minimize or eliminate effects of the interference where the transceiver is co-located within an appliance, such as a microwave oven, including an interfering device. Referring to FIG. 4 the method begins with rreceiving in a processor of the transceiver information from a processor or controller in the appliance or interfering device on potential interference emanating from the interfering device (402). The information can include information on periodicity, duty-cycle, duration (e.g., cooking time) and power level of the expected interfering EM radiation pulses, as well as a spectrum of interference ranges. Typically, interference emanating from a microwave oven is between 2.45 and 2.465 MHz, interfering with Wi-Fi channels 8-11. This information is then stored by the transceiver processor in a memory the transceiver (404). Generally, the energy emitted by a microwave oven is at a fixed frequency and the periodicity and duty-cycle follows a fixed pattern related to that of an alternating current (AC) power (60 Hz in the U.S.), and transmits only during negative or positive phase of the power supplied having a duty maximum cycle of about 50%. Thus, information on periodicity, duty-cycle and spectrum of interference ranges can alternatively be stored in a non-volatile memory of the transceiver by a manufacturer at the time of manufacturing the appliance, and the information sent to the transceiver can include or consist solely of information on the power level and duration or cooking time.

The processor in the transceiver now knows to expect interference with a known pattern for the next "X" minutes where X is the information on duration received and stored in the proceeding steps, and the transceiver processor can now apply one or more interference mitigation techniques (406). The mitigation techniques applied can include switching to a new channel or band free of interference (406*a*), reduce sensitivity of a receiver or receiving circuit in the transceiver to a level where interference is not perceived (406*b*), and/or signaling other stations (STA) and access points (AP) in the wireless network to refrain from all receptions/transmissions while interference is anticipated (406*c*).

Regarding switching channels or bands, block 406*a*, if the transceiver is a dual or multi-band device, for example capable of 2 GHz (2G) and 5 GHz (5G) operation, it can temporarily or permanently switch to 5G operation if the other stations and access points support it. If the transceiver is station it can treat the interference as emanating from a coexisting device and send a power management (PM), a notice of absence (NOA) or a target wait time (TWT) signal to access points in the wireless network to avoid all communication traffic during either the entire duration in which the interfering device is operating, or during just the time periods in which the interfering device is actually transmitting (e.g., 8 ms out of every 16.67 ms for a typical microwave oven). If the transceiver is an access point or peer-to-peer (P2P) device, it can send a channel switch announcement (CSA) to let all the stations and access points on the wireless network know it the is now moving to a new channel or band.

Regarding reducing the sensitivity of the receiver in the transceiver, block 406*b*, this can be accomplished by reducing a gain of a variable amplifier in the receiver either during the entire duration in which the interfering device is operating, or during the just time periods in which the interfering device is actually transmitting.

Finally, the processor in the transceiver can reverse or cease from applying the interference mitigation techniques, i.e., by restoring the sensitivity of the receiver, returning to an original channel or band and/or sending a clear to send (CTS) signal to other stations and access points in the wireless network once the interference is ended (408).

Figure 5:
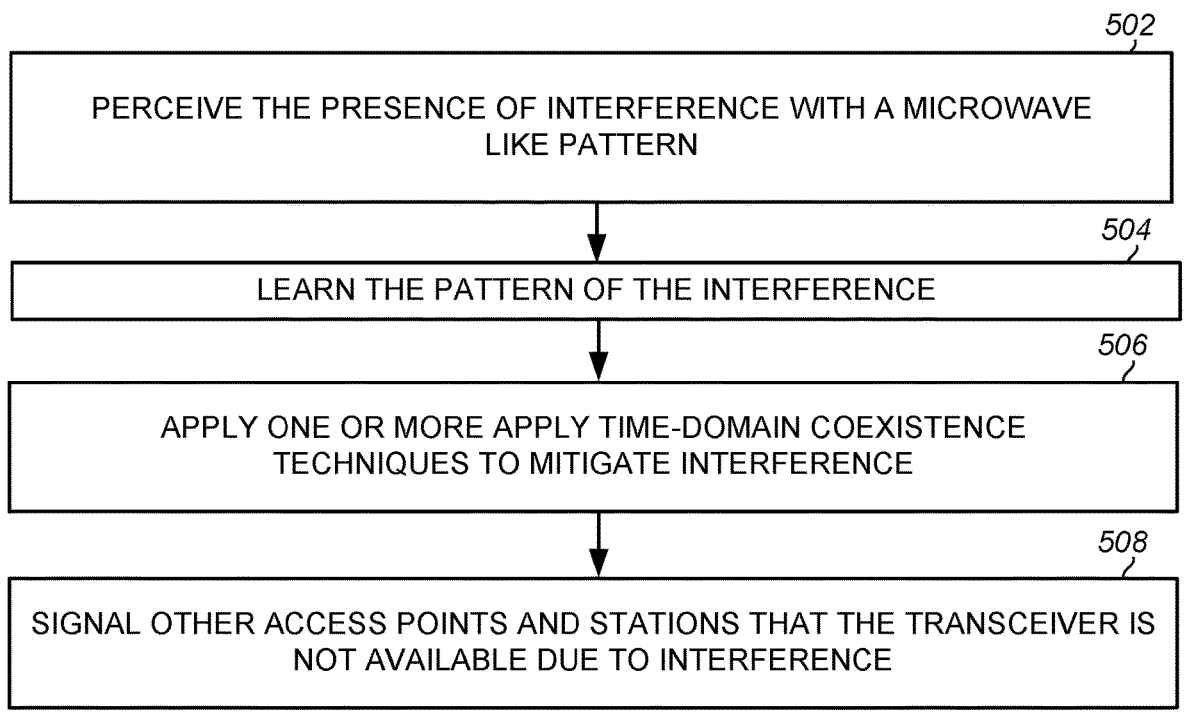
FIG. 5 is a flowchart of a method for operating a transceiver to minimize or eliminate interference in a wireless network wherein the transceiver is coexistent with but separate and distinct from an interfering device according to a first embodiment of the present disclosure.
Figure 6:
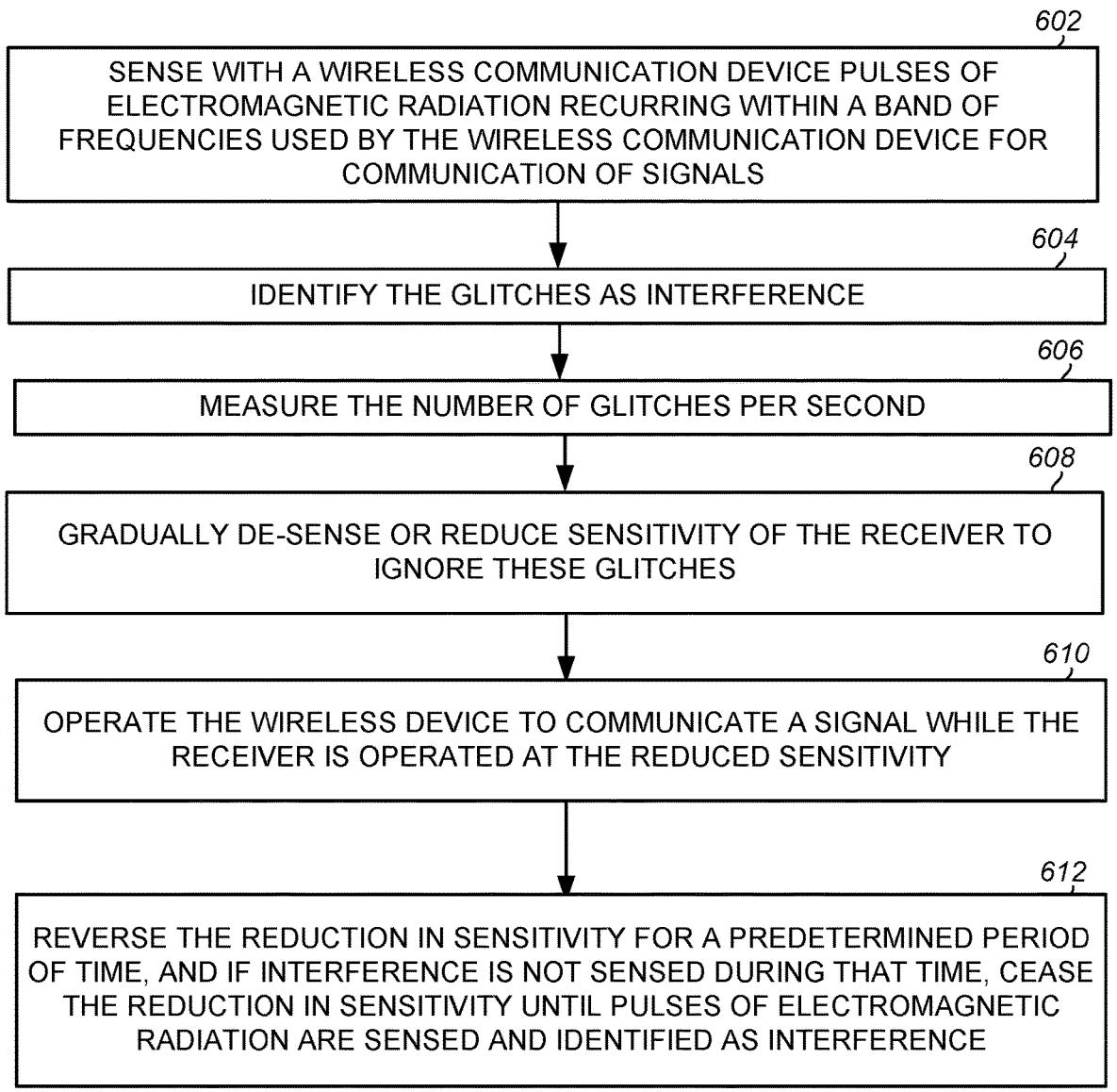
FIG. 6 is a flowchart of a method for operating a transceiver to minimize or eliminate interference in a wireless network wherein the transceiver is coexistent with an interfering device according to a second embodiment of the present invention.
Figure 7:
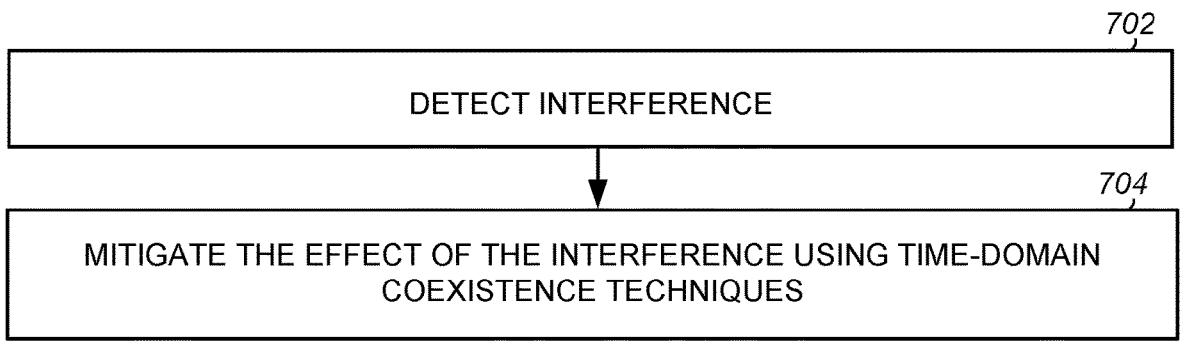
FIG. 7 is a flowchart of a method for operating a transceiver to minimize or eliminate interference in a wireless network wherein the transceiver is coexistent with an interfering device according to a third embodiment of the present invention.

FIGS. 5 through 7 are flowcharts of methods for operating a Wi-Fi device in a wireless network to minimize or eliminate interference where the transceiver is coexistent with but separate and distinct from an interfering device.

Referring to FIG. 5 in another embodiment the method begins with using an in-built energy detection mechanism in the Wi-Fi device to perceive or detect the presence of interference with a microwave like pattern, i.e., having a 60 Hz period or duty-cycle, and overlapping one or more of Wi-Fi channels 8 through 11, (502), and learning the pattern of the interference (504). Once the Wi-Fi device learns the pattern of the interference, it can use time-domain coexistence techniques to mitigate any interference (506). The time-domain coexistence techniques can include the transceiver processor sending one or more of a power management (PM) signal, notice of absence signal (NOA), target wait time (TWT) signal indicating a time to wait off-line, clear to send to self (CTS2Self) signal to itself. Optionally, as shown in FIG. 5, the transceiver processor can send such signals to other access points and stations in the wireless network about the periods when the transceiver is not available due to interference (508).

The energy detection mechanism can include either a direct communication from a controller in an interfering device co-located with the Wi-Fi or wireless communication device, or a carrier signal strength detection circuit in a Wi-Fi device coexistent with the interfering device. For example, where the interfering device is a microwave oven or appliance including Wi-Fi device, the controller of the microwave circuit or portion of the appliance can directly communicate to a processor or controller in the Wi-Fi information on frequency and power of the interfering pulse of electromagnetic radiation, thereby enabling the Wi-Fi device to block transmission and attempts to receive during the time periods when the interference is being transmitted, effectively masking the interference. In other embodiments where the Wi-Fi and interfering device, such as a microwave, are coexistent, but not co-located in the wireless network the wireless device detects the interfering pulses of electromagnetic radiation through a carrier signal strength detection circuit, determines the pulse are not Wi-Fi packets and treats these energy pulses a "glitches," and masks the interference by reducing the sensitivity of the receiver as described above at a frequency corresponding to that of the interfering pulses.

In another embodiment, a method for mitigating interference from an interfering device coexistent but not co-located with a Wi-Fi device involves sensing and identifying interference in a wireless network, and gradually de-sensing or reducing sensitivity of a receiver in the Wi-Fi device to mitigate the interference. This technique for mitigation is particularly effective where the interference includes recurring pulses of electromagnetic radiation, such as microwave energy pulses, within a band of frequencies used by the wireless communication device for communication of signals. Because such pulses are typically strong enough to be sensed by the Wi-Fi device, but do not include header information or data, and are often weaker than a signal including a real Wi-Fi packet, it is possible to reduce the sensitivity of the receiver either throughout the entire duration in which the interfering device is operating, or during just the time periods in which the interfering device is actually transmitting (e.g., 8 ms out of every 16.67 ms for a typical microwave oven).

Referring to FIG. 6 the method begins with sensing with a wireless communication device pulses of electromagnetic radiation recurring within a band of frequencies used by the wireless communication device for communication of signals (602). A determination is then made identifying the pulses as interference (604). As noted above this determination can be made using a processor in the wireless device to confirm that the pulses do not include either header information or data, are not Wi-Fi packets, are therefore not part of a wireless communication signal. Next, the receiver will consider these energy pulses a "glitches" and the number of glitches per second or frequency of the interference measured (606), and the sensitivity of the receiver gradually de-sensed or reduced to enable the receiver to ignore these glitches (608).

Generally, the sensitivity of the receiver can be reduced by reducing a gain of a variable amplifier in the receiver or by reducing power to the entire receiver either throughout the entire duration in which the interfering device is operating, or during just the time periods in which the interfering device is actually transmitting. Optionally, the sensitivity of the receiver can be reduced by decoupling the receiver from an antenna of the wireless communication device during the time periods in which the interfering device is actually transmitting.

The wireless device can then be operated to communicate a signal with the wireless communication device while the receiver is operated at the reduced sensitivity (610). By communicating a signal it is meant either to receive or transmit a signal including a number of Wi-Fi packets. Optionally, where the communication includes transmitting a signal, the wireless device can be operated to transmit at a higher power by increasing a gain of a power amplifier in a transmitter of the wireless device.

Finally, the wireless device can be operated to temporarily reverse the reduction in sensitivity for a predetermined period of time, and if interference is not sensed during that time, ceasing the reduction in sensitivity until pulses of electromagnetic radiation are sensed and identified as interference (612). Again the sensitivity of the receiver can be reduced either throughout the entire duration in which the interfering device is operating, or during just the time periods in which the interfering device is actually transmitting as determined from the number of glitches per second or frequency of the interference measured.

FIG. 7 is a flowchart of a method for operating a transceiver in a dual-band 2G/5G wireless device equipped with radar detection to minimize or eliminate interference in a Wi-Fi wireless network where the transceiver is coexistent with an interfering device. Note, radar detection is required for Dynamic Frequency Selection (DFS) band operation in 5G, and thus is typically included in such dual-band 2G/5G wireless devices. Referring to FIG. 7 the method begins with detecting interference (702), and mitigating the effect of the interference it using time-domain coexistence techniques to mitigate any interference (704). The pulses of electromagnetic radiation can be detected and identified as interference by using the processor and the radar detection capability of the wireless device to match a frequency and duration of the pulses (chirp-rate) to a known pattern of microwave pulses stored in memory of the wireless device. The time-domain coexistence techniques can include the transceiver processor sending one or more of a power management (PM) signal, notice of absence signal (NOA), target wait time (TWT) signal indicating a time to wait off-line, clear to send to self (CTS2Self) signal to itself or to other access points and stations in the wireless network about the periods when the transceiver is not available.

Figure 8:
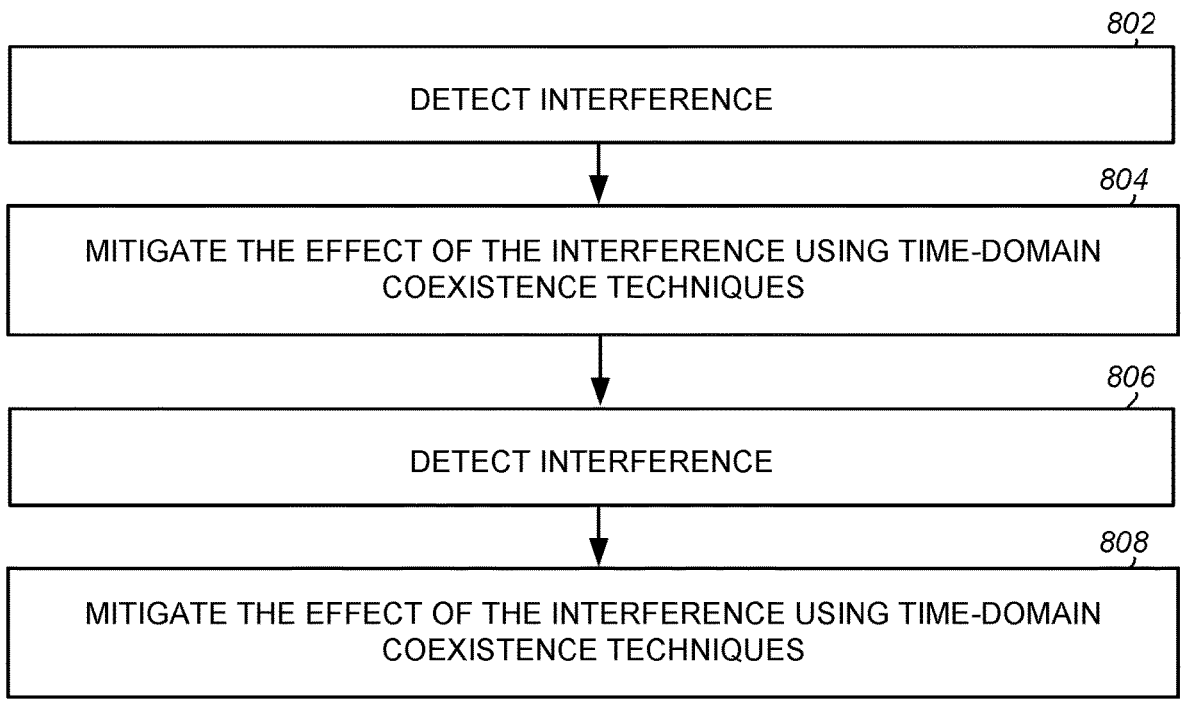
FIG. 8 is a flowchart of a method for operating a transceiver in a combined BT/Wi-Fi device to minimize or eliminate interference in a wireless network wherein the transceiver is coexistent with an interfering device according to an embodiment of the present invention.
Figure 9:
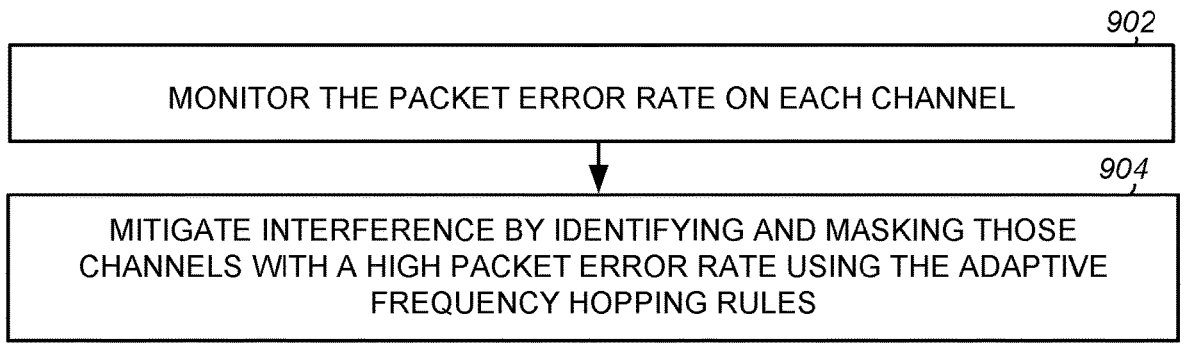
FIG. 9 is a flowchart of a method for operating a transceiver in a BT device to minimize or eliminate interference in a BT wireless network wherein the transceiver is coexistent with an interfering device according to another embodiment of the present invention.

FIGS. 8 and 9 are flowcharts of methods for operating a Wi-Fi device in a wireless network to minimize or eliminate interference where the transceiver is coexistent with but separate and distinct from an interfering device.

FIG. 8 illustrates a method for operating transceivers in a combined BT/Wi-Fi device to minimize or eliminate interference where the transceiver is coexistent in a wireless network with an interfering device. The method begins with learning, sensing or detecting the interference using a Wi-Fi portion of the combined device (802). Generally, the Wi-Fi portion of the combined device can perceive or detect the presence of pulses of electromagnetic radiation, determine the pulses include interference by noting an absence of header and data information or by matching a frequency and duration of the pulses (chirp-rate) to a known pattern of microwave pulses stored in memory of the combined device and learning the power, frequency and duration of the interference. The Wi-Fi can then mitigate interference in the Wi-Fi portion (804) using any of the mitigation techniques described above including switching to a new channel or band free of interference, reducing sensitivity of a receiver, signaling other Wi-Fi stations and access points in the wireless network to refrain from receptions/transmissions while interference is anticipated, and/or using time-domain coexistence techniques including sending a PM, NOA TWT or CTS2Self signals to itself or to other access points and stations. Next a processor in the combined device can pass information learned on the power, frequency and duration of the interference to the BT portion of the combined device and/or to other BT devices in the wireless network (806) via a coexistence interface so that the BT devices can mask those channels effected by the interference using adaptive frequency hopping (AFH) (808).

FIG. 9 is a flowchart of a method for operating a transceiver in a BT device to minimize or eliminate interference where the transceiver is co-located or coexisting with an interfering device in a wireless network. Generally, the method involves monitoring the packet error rate (PER) on each BT channel (902), and mitigating the interference by identifying and masking those channels with a higher PER using the adaptive frequency hopping rules (904).

Thus, wireless communication devices and methods for operating the same for mitigating interference in a wireless communication network have been disclosed. Embodiments of the present invention have been described above with the aid of functional and schematic block diagrams illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

It is to be understood that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The breadth and scope of the present invention should not be limited by any of the above-described exemplary embodiments, but should be defined only in accordance with the following claims and their equivalents.

What is claimed is:

1. A method for mitigating interference in a wireless communication network comprising:
    sensing with a wireless communication device pulses of electromagnetic radiation recurring within a band of frequencies used by the wireless communication device for communication of signals;
    identifying the pulses as interference;
    determining a number of frequencies in the interference within the band of frequencies;
    reducing sensitivity of the wireless communication device upon sensing one of the pulses at a frequency corresponding to the frequency of the interference;
    communicating a signal with the wireless communication device while operating at the reduced sensitivity; and
    temporarily reversing the reduction in sensitivity of the wireless communication device, and if pulses of electromagnetic radiation are not sensed by the wireless communication device during a predetermined period of time, ceasing the reduction in sensitivity of the wireless communication device until pulses of electromagnetic radiation are sensed and identified as interference.

2. The method of claim 1 wherein the signal comprises a number of packets including header information and data, and wherein identifying the pulses as interference comprises determining the pulses do not include header information or data.

3. The method of claim 2 wherein the wireless communication network is a Bluetooth (BT) network, and wherein the number of packets includes BT packets.

4. The method of claim 2 wherein the wireless communication network is a Wi-Fi network, and wherein the number of packets includes Wi-Fi packets.

5. The method of claim 1 wherein reducing sensitivity of the wireless communication device comprises reducing gain of an amplifier in a receiving circuit of the wireless communication device.

6. The method of claim 1 wherein reducing sensitivity of the wireless communication device comprises decoupling an antenna from a receiving circuit of the wireless communication device.

7. The method of claim 1 wherein the pulses of electromagnetic radiation emanate from a non-communication device.

8. The method of claim 7 wherein the non-communication device comprises a microwave appliance.

9. The method of claim 7 wherein the non-communication device coexists with the wireless communication device within range of the wireless communication network.

10. The method of claim 7 wherein the non-communication device is co-located with the wireless communication device.

11. The method of claim 1 further comprising signaling other access points and stations in the wireless network about periods when the wireless communication device is not available due to interference.

12. An integrated circuit (IC) comprising:
a receiver for coupling to an antenna, the receiver configured to sense pulses of electromagnetic radiation and decode signals received therein;
a transmitter for coupling to the antenna and configured to encode and transmit signals as electromagnetic radiation from the antenna; and
a processor coupled to the receiver and transmitter to control operation thereof, wherein the processor is configured to:
identify interference among the pulses received by the receiver;
determine a number of frequencies in the interference within a band of frequencies used by the receiver; and
reduce sensitivity of the receiver upon sensing one of the pulses at a frequency corresponding to the frequency of the interference, wherein the processor is further configured to temporarily reverse the reduction in sensitivity and if interference is not identified during a predetermined period of time, cease the reduction in sensitivity of the receiver until interference is identified.

13. The IC of claim 12 wherein the signal comprises a number of packets including header information and data, and wherein the processor identifies the interference by determining the pulses do not include header information or data.

14. The IC of claim 12 further comprising a switch between the antenna and the receiver and transmitter, wherein reducing sensitivity of the receiver comprises controlling the switch to decouple the antenna from the receiver.

15. An appliance including an integrated circuit (IC), the IC comprising:
a receiver coupled to an antenna, the receiver configured to sense pulses of electromagnetic radiation and decode therefrom signals comprising a number of packets including header information and data;
a transmitter coupled to the antenna and configured to encode and transmit signals from the antenna as electromagnetic radiation; and
a processor coupled to the receiver and transmitter to control operation thereof,
wherein the processor is configured to:
identify interference among the pulses received by the receiver;
determine a number of frequencies in the interference within a band of frequencies used by the receiver;
reduce a sensitivity of the receiver upon sensing one of the pulses at a frequency corresponding to the frequency of the interference; and
temporarily restoring the sensitivity of the receiver until pulses of electromagnetic radiation are sensed and identified as interference.

16. The appliance of claim 15 wherein the signal comprises, and wherein the processor identifies the interference by determining the pulses do not include header information or data.

17. The appliance of claim 15 wherein reducing sensitivity of the receiver comprises reducing gain of an amplifier in the receiver.

18. The appliance of claim 15 further comprising a microwave oven co-located with the IC, and wherein the interference emanates from the microwave oven.

* * * * *